United States Patent
Shiraishi

(10) Patent No.: US 10,063,532 B2
(45) Date of Patent: Aug. 28, 2018

(54) AUTHENTICATION APPARATUS THAT AUTHENTICATES USER

(71) Applicant: KYOCERA Document Solutions Inc., Osaka (JP)

(72) Inventor: Takanori Shiraishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 149 days.

(21) Appl. No.: 15/197,235

(22) Filed: Jun. 29, 2016

(65) Prior Publication Data

US 2016/0380993 A1    Dec. 29, 2016

(30) Foreign Application Priority Data

Jun. 29, 2015  (JP) ................. 2015-129792

(51) Int. Cl.
*H04L 29/06* (2006.01)
*H04W 12/06* (2009.01)

(52) U.S. Cl.
CPC .......... *H04L 63/08* (2013.01); *H04L 63/0492* (2013.01); *H04L 63/06* (2013.01); *H04L 63/0876* (2013.01); *H04W 12/06* (2013.01); *H04L 2463/082* (2013.01)

(58) Field of Classification Search
CPC ........... H04L 63/08; H04L 63/0492; H04L 2463/082; G07C 9/00111
See application file for complete search history.

(56) References Cited

U.S. PATENT DOCUMENTS

2008/0040817 A1* 2/2008 Kawai ................ G06F 21/608
726/34
2014/0139315 A1  5/2014 Keranen et al.
2015/0379791 A1* 12/2015 Russell ............ G07C 9/00031
340/5.61

FOREIGN PATENT DOCUMENTS

| JP | 2003-085150 A | 3/2003 |
| JP | 2005-139824 A | 6/2005 |
| JP | 2005-202650 A | 7/2005 |
| JP | 2009-099086 A | 5/2009 |

* cited by examiner

*Primary Examiner* — Ellen Tran

(74) *Attorney, Agent, or Firm* — Hawaii Patent Services; Nathaniel K. Fedde; Kenton N. Fedde

(57) ABSTRACT

Provided is an authentication apparatus that performs user authentication, using a wearable terminal worn by a user, whereby allowing a high security to be achieved. It includes a storage part that stores a piece of authentication information in which a piece of terminal information that identifies the wearable terminal worn by the user is registered, a communication part that makes communication with the wearable terminal worn by the user to acquire a piece of terminal information, and an authenticating part that performs user authentication in the case where the same piece of terminal information as that registered in the authentication information has been acquired by the communication part.

7 Claims, 18 Drawing Sheets

FIG.3A

Authentication information 91

| | Terminal identification information | Wearing location information | Use authority information |
|---|---|---|---|
| 1 | aaaaa | C | |
| 2 | bbbbb | A | |
| 3 | | | |
| 4 | | | |
| 5 | | | |

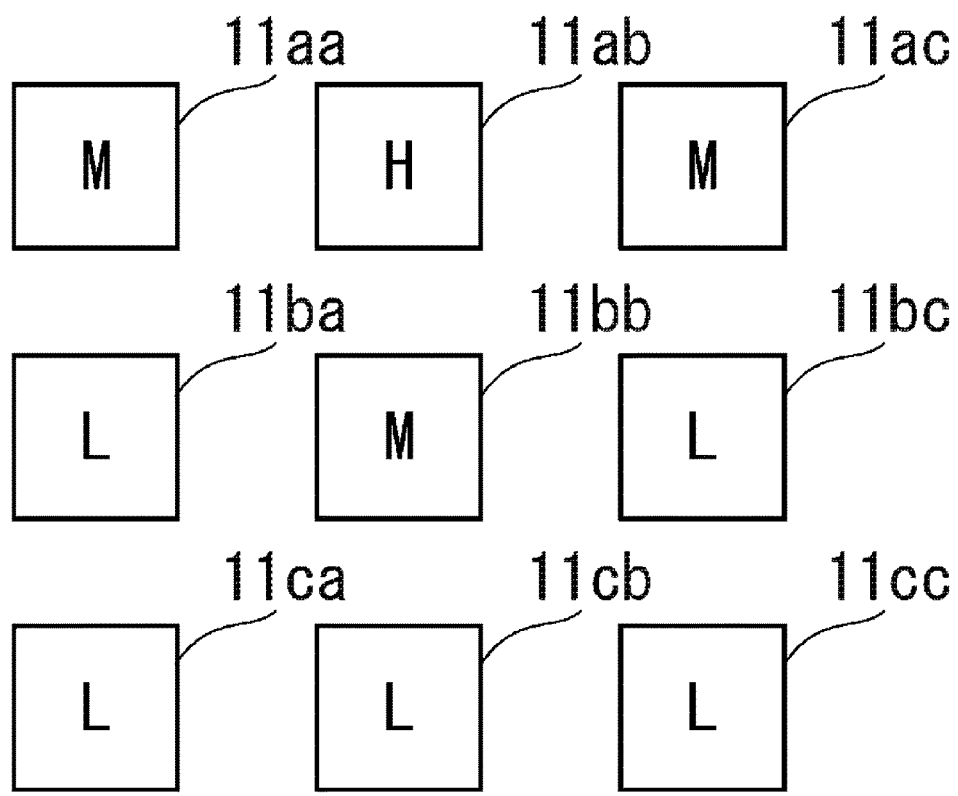

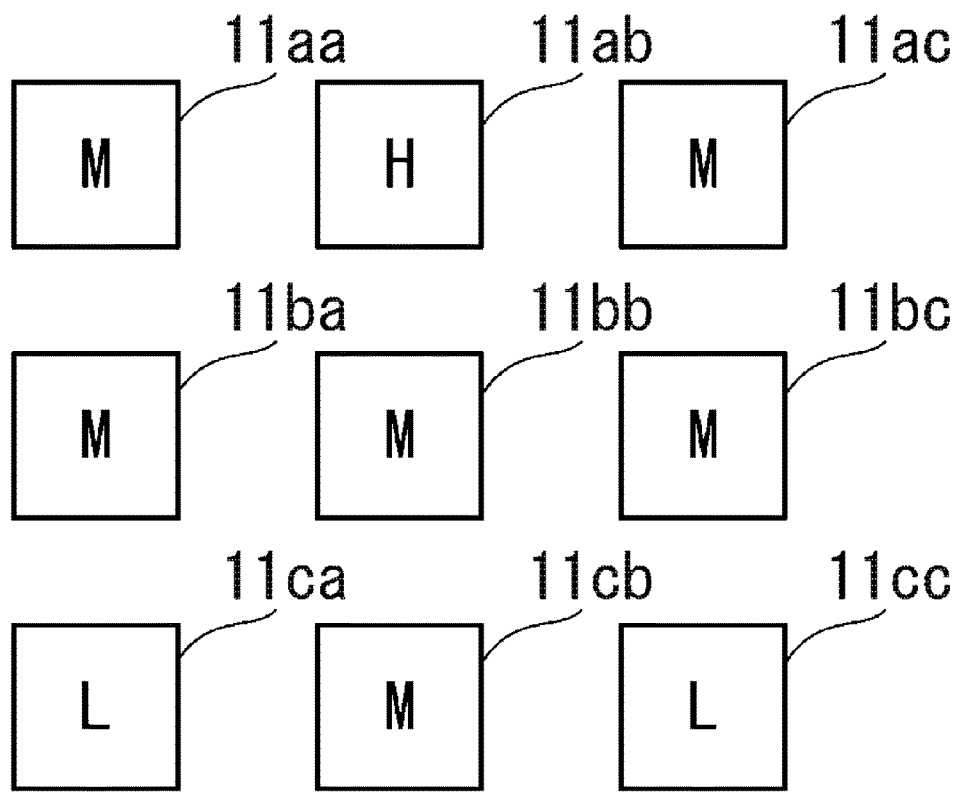

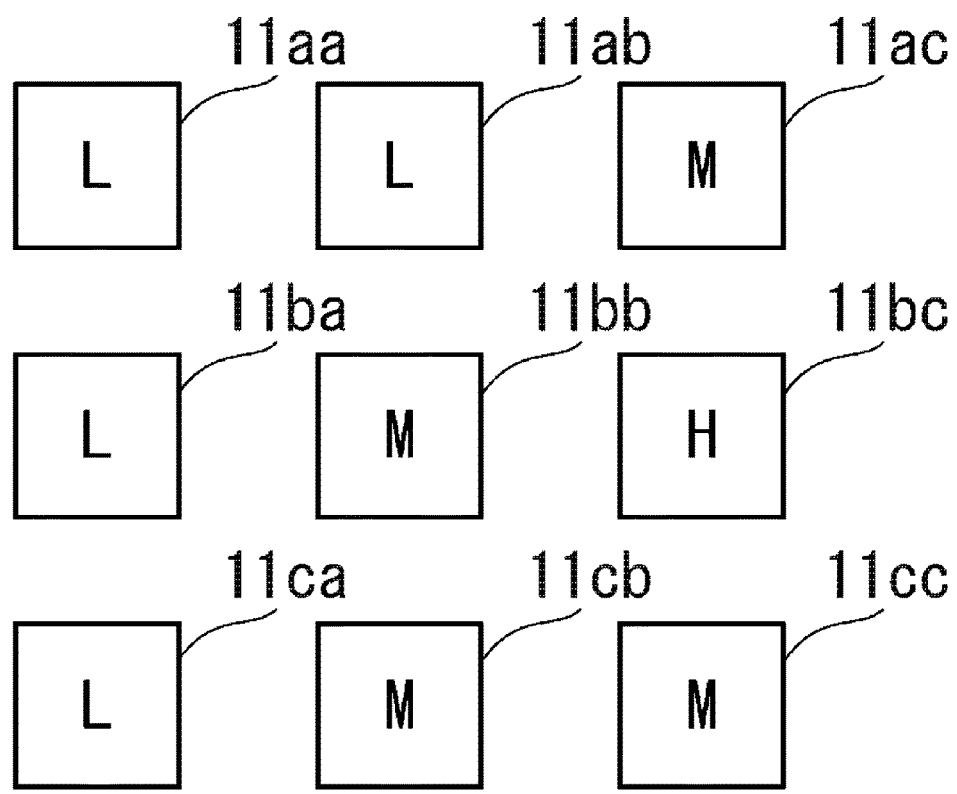

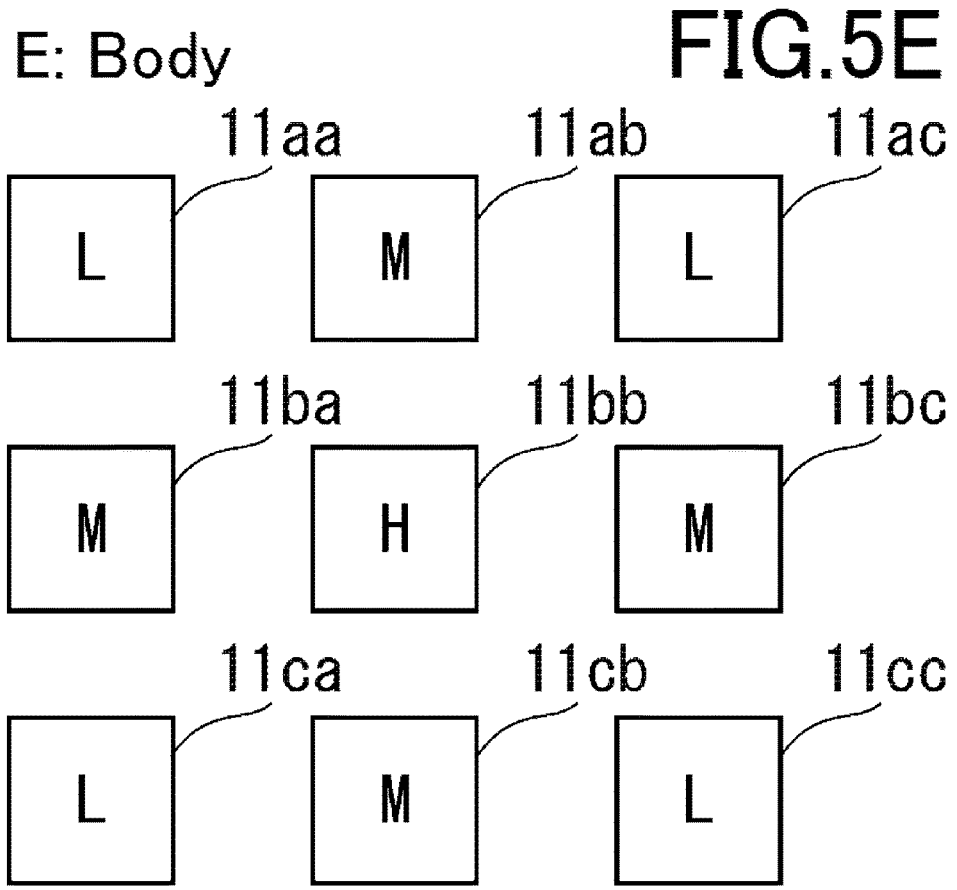

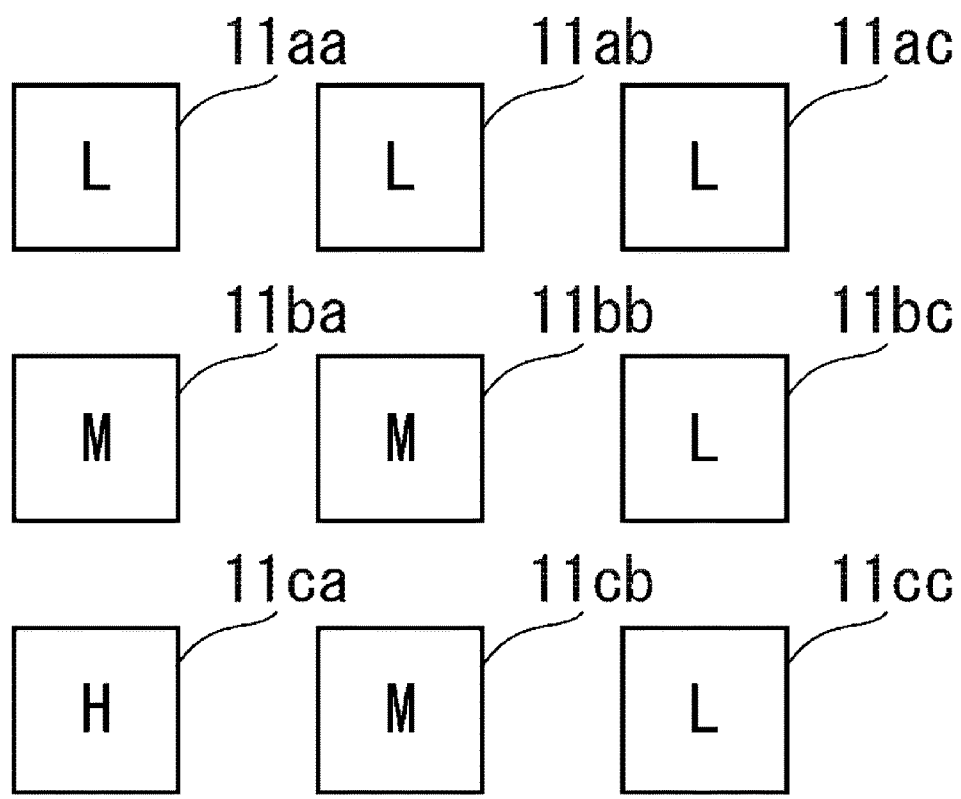

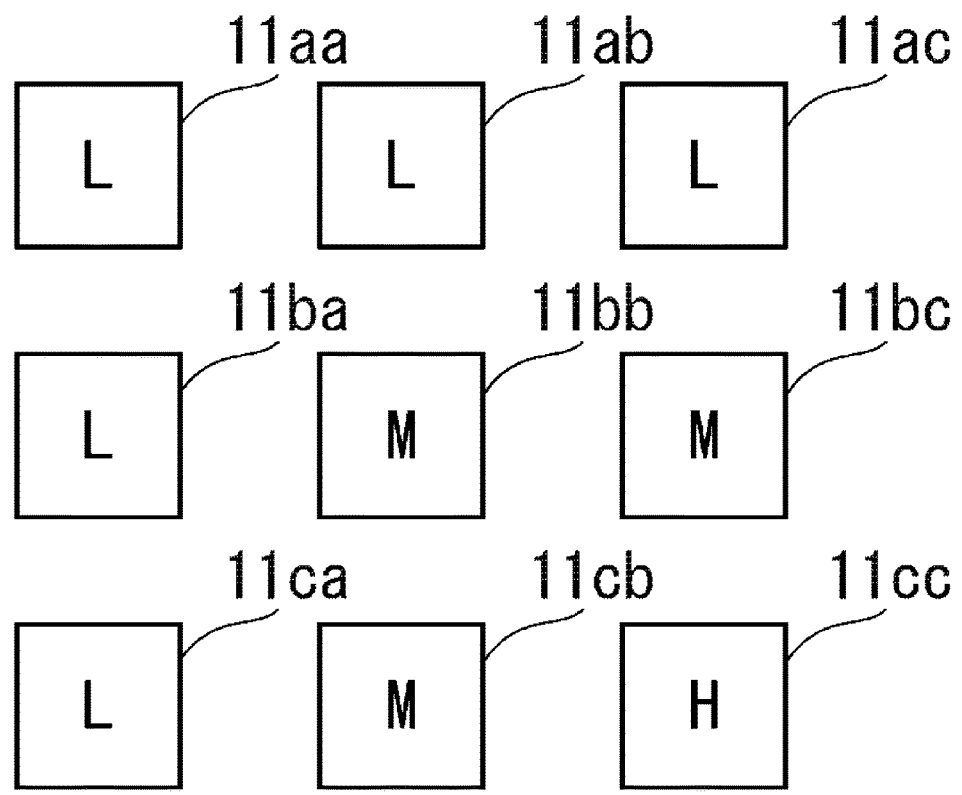

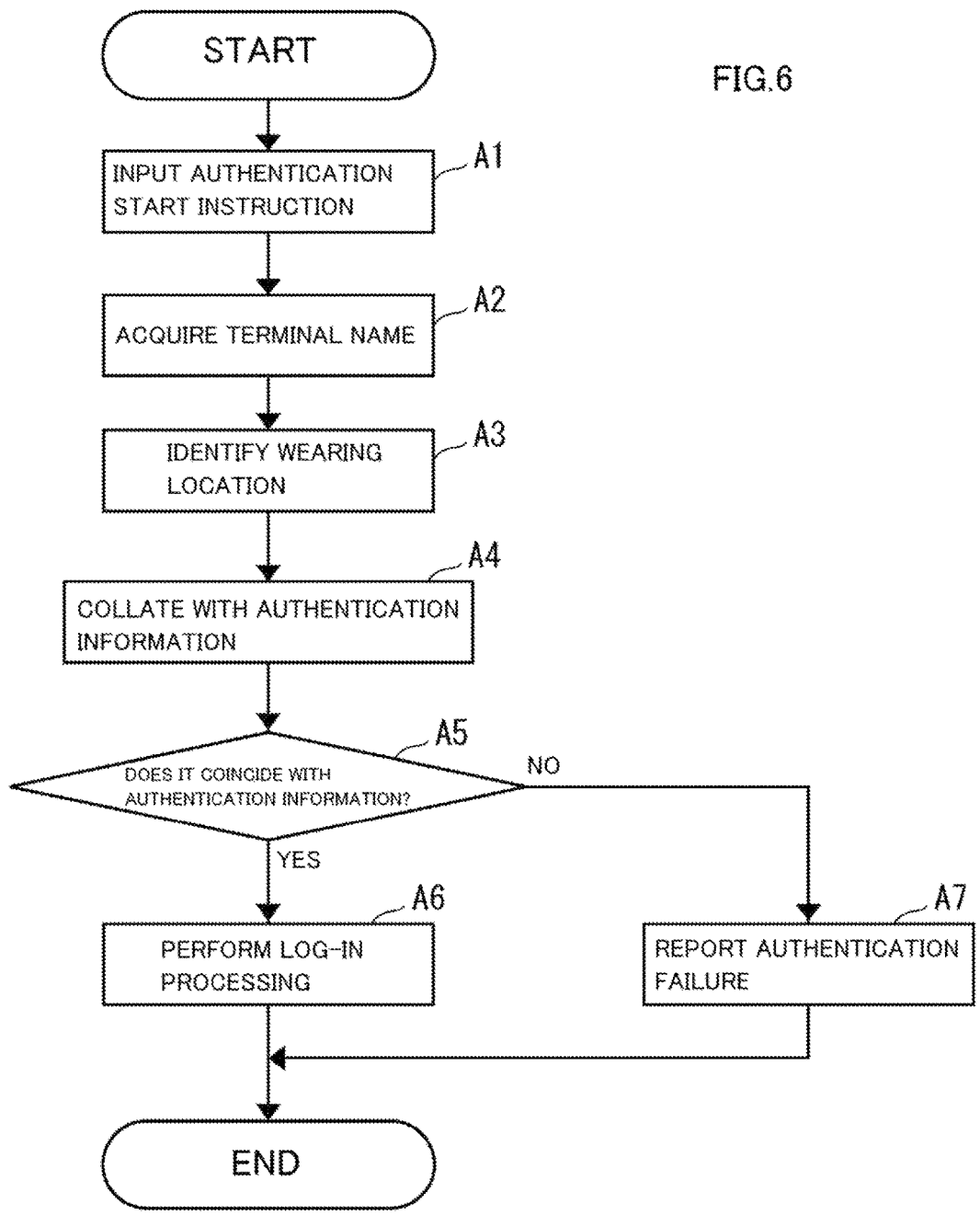

FIG.7

Authentication information 91a

| | Terminal information | Use authority information |
|---|---|---|
| Main | aaaaa | |
| Sub | bbbbb | |
| Sub | | |
| Sub | | |
| Sub | | |

FIG. 8A

Authentication information 91b

| | Terminal identification information | Wearing location information | Use authority information |
|---|---|---|---|
| 1 | aaaaa | C | |
| 2 | bbbbb | A | |
| 3 | ccccc | J | |
| 4 | | | |
| 5 | | | |

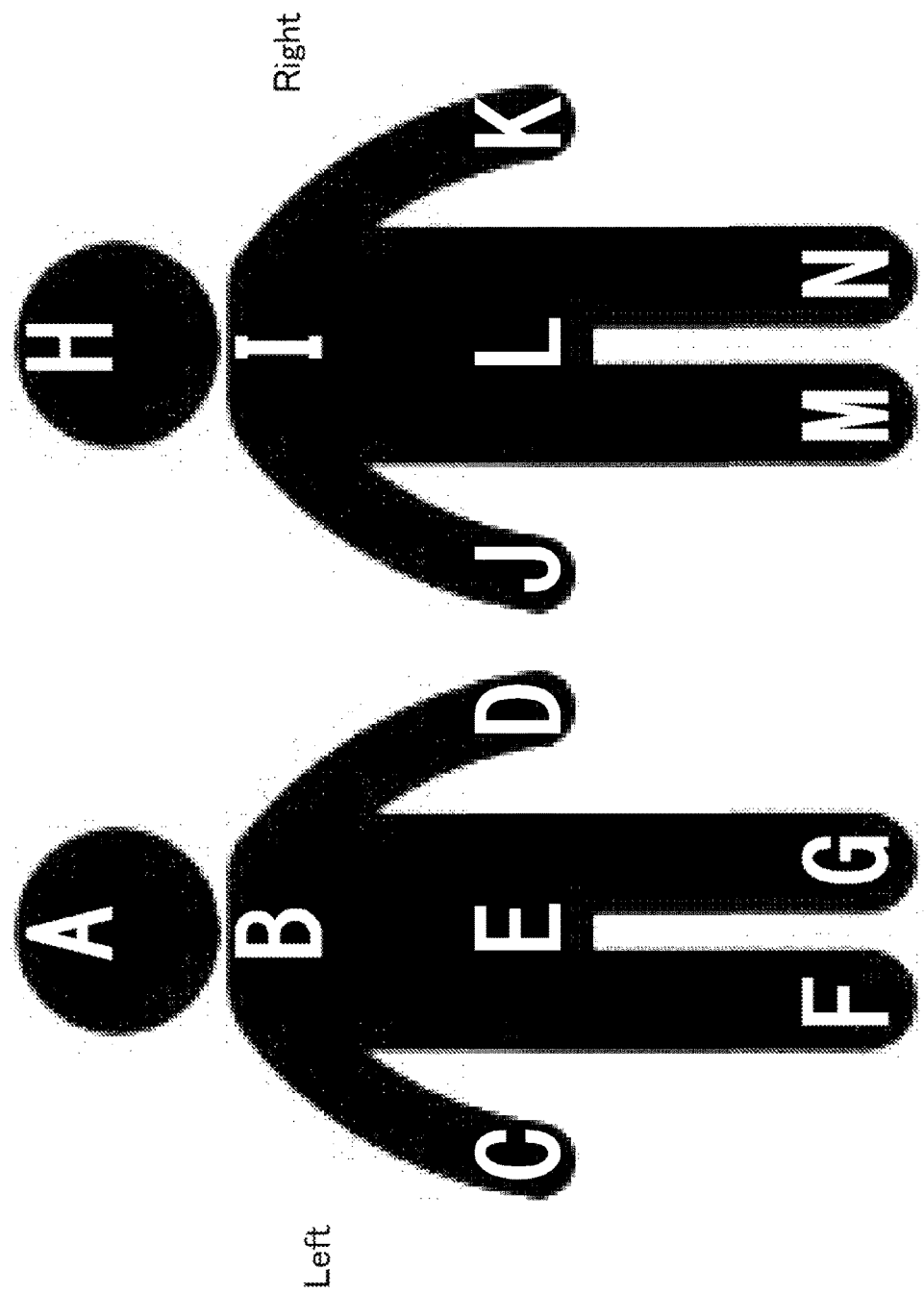

FIG.9A

Authentication information 91c

| | Terminal identification information | Wearing location information | Use authority information |
|---|---|---|---|
| 1 | aaaaa | C → E → B | |
| 2 | bbbbb | A | |
| 3 | | | |
| 4 | | | |
| 5 | | | |

US 10,063,532 B2

AUTHENTICATION APPARATUS THAT AUTHENTICATES USER

INCORPORATION BY REFERENCE

This application is based on and claims the benefit of priority f ROM Japanese Patent Application No. 2015-129792 filed on Jun. 29, 2015, the contents of which are hereby incorporated by reference.

BACKGROUND

The present disclosure relates to an authentication apparatus that authenticates a user.

In the case where a piece of electronic equipment, such as a copying machine or an MFP (Multifunction Peripheral), is to be used in an office, being shared, a user thereof is authenticated by an authentication apparatus for grasping the situation of use and executing the charging management. Authentication of a user is generally performed by inputting an identification code (a personal ID or a password), however, in recent years, it has been proposed to use a mobile terminal, such as a smartphone, for improvement of the convenience of user authentication. With a typical technique, at the time of using apiece of electronic equipment, apiece of unique identification information of a mobile terminal is provided for an authentication apparatus, and thus the mobile terminal is used as a key for authentication.

SUMMARY

An authentication apparatus of the present disclosure includes: a storage part that stores a piece of authentication information in which a piece of terminal information that identifies a wearable terminal worn by a user is registered, a communication part that makes communication with the wearable terminal worn by the user to acquire the piece of terminal information, and an authenticating part that, in the case where the same piece of terminal information as the piece of terminal information registered in the piece of authentication information has been acquired by the communication part, performs user authentication.

BRIEF DESCRIPTION OF THE DRAWINGS

FIG. 3A is a figure giving an example of piece of authentication information stored in a storage part shown in FIG. 2;

FIG. 5A is an explanatory drawing illustrating an example of identification of a wearing location by a wearing location identifying part shown in FIG. 2;

FIG. 5B is an explanatory drawing illustrating an example of identification of a wearing location by the wearing location identifying part shown in FIG. 2;

FIG. 5D is an explanatory drawing illustrating an example of identification of a wearing location by the wearing location identifying part shown in FIG. 2;

FIG. 5E is an explanatory drawing illustrating an example of identification of a wearing location by the wearing location identifying part shown in FIG. 2;

FIG. 5F is an explanatory drawing illustrating an example of identification of a wearing location by the wearing location identifying part shown in FIG. 2;

FIG. 5G is an explanatory drawing illustrating an example of identification of a wearing location by the wearing location identifying part shown in FIG. 2;

FIG. 6 is a flowchart illustrating the authentication operation by the authenticating part shown in FIG. 2;

FIG. 7 is a figure giving another example of piece of authentication information stored in the storage part shown in FIG. 2;

FIG. 8A is a figure giving another example of piece of authentication information stored in the storage part shown in FIG. 2;

FIG. 8B is a figure giving another example of piece of authentication information stored in the storage part shown in FIG. 2;

FIG. 9A is a figure giving another example of piece of authentication information stored in the storage part shown in FIG. 2.

DETAILED DESCRIPTION

Figure 1:
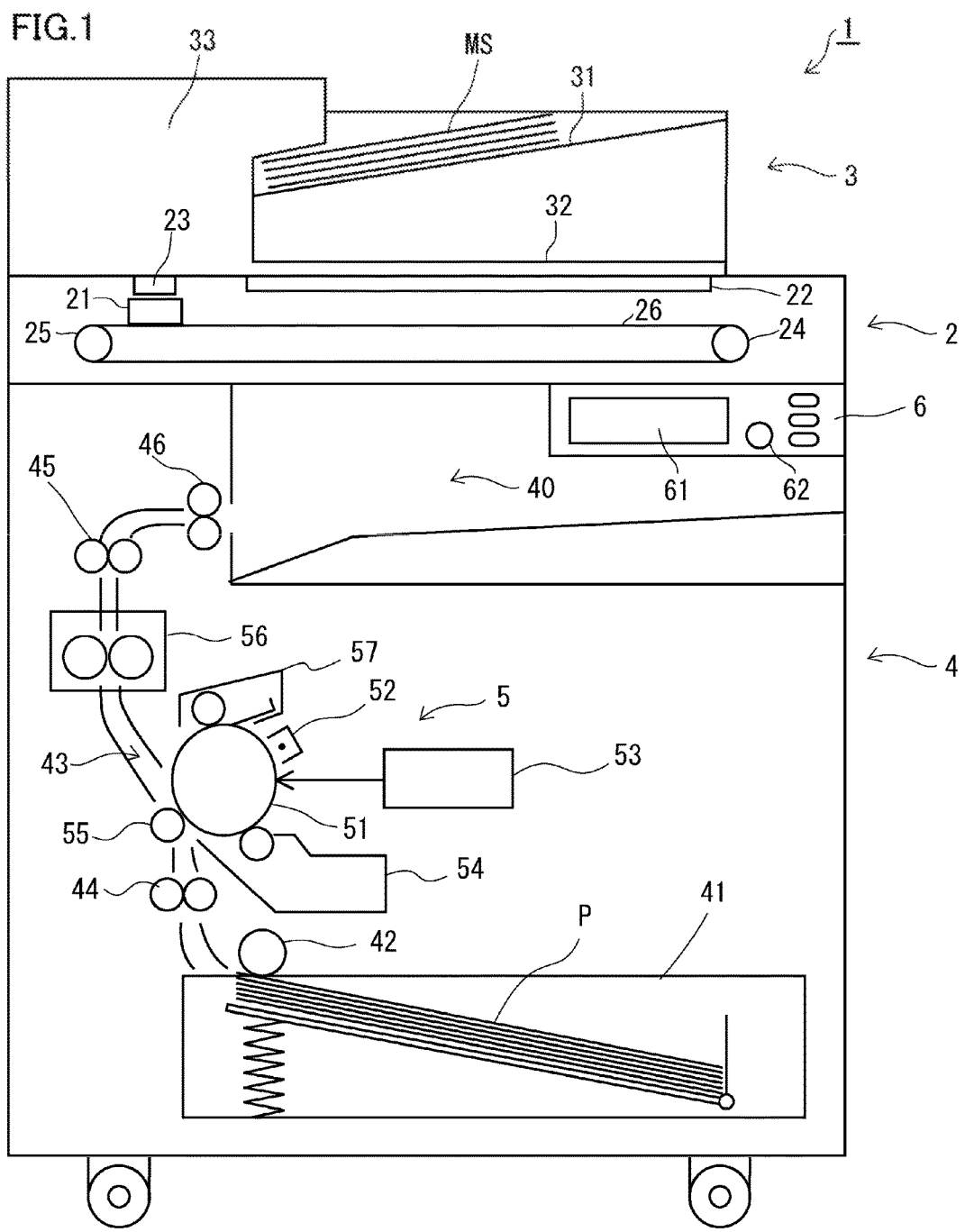
FIG. 1 is a schematic sectional view showing an internal configuration of an embodiment of an authentication apparatus according to the present disclosure.

Next, an embodiment of the present disclosure will be specifically explained with reference to the drawings. In the present embodiment, an image forming apparatus 1, such as a copying machine or an MFP (Multifunction Peripheral), utilizing an electrophotography, itself provides an authentication apparatus, and with reference to FIG. 1, the image forming apparatus 1 includes a document reading part 2, a document feeding part 3, a main body part 4, and an operation part 6. The document feeding part 3 is disposed above the document reading part 2, which is disposed on the main body part 4, and between the document reading part 2 and the main body part 4, there is formed a paper delivery spacing 40.

In the operation part 6, there are provided a touch panel 61, and operation buttons 62. A user operates the operation part 6 to input instructions, thereby performing various settings for the image forming apparatus 1 to cause various functions, such as scanning operation and image formation, to be executed. The touch panel 61 displays the conditions of the image forming apparatus 1, indicates the status of image formation and the number of print copies, and allows specifying a function, such as both-side printing or white-black reversal, and performing various settings, such as magnification setting and concentration setting. As the operation buttons 62, there are provided a start button for instructing start of the scanning operation or the image forming, a stop button for instructing stop of the scanning operation or the image forming, a reset button for use in defaulting various settings for the image forming apparatus 1, and the like.

The document reading part 2 includes a scanner 21, which is provided with a light source, such as an LED or a cold cathode tube, and an imaging device, such as a CCD sensor, leading the light of the light source to the image surface of a document MS, and then leading the reflected light from the image surface to the imaging device, a platen glass 22, and a document reading slit 23. The scanner 21 is fixed to a toothed belt 26 stretched between a motor 24 and a pulley 25, and by driving the motor 24, the scanner 21 is moved along the image surface of the document MS placed on the platen glass 22, scanning the image surface of the document MS. The platen glass 22 is a document table that is formed of a transparent material, such as glass. The document reading slit 23 is a slit that is formed in a direction orthogonal to the direction of conveyance of a document by the document feeding part 3.

When the document MS placed on the platen glass 22 is to be read, the scanner 21 is moved in a sub-scanning direction along the platen glass 22, while scanning the document MS placed on the platen glass 22 line by line in a main scanning direction, thereby an image data being acquired, and the image data that has been acquired being outputted to the main body part 4. Further, when the scanner 21 is to read the document MS that has been fed by the document feeding part 3, the scanner 21 is moved to a position opposed to the document reading slit 23, and through the document reading slit 23, the document MS is read in synchronization with the document feeding operation by the document feeding part 3 to acquire an image data, and the image data that has been acquired is outputted to the main body part 4.

The document feeding part 3 includes a document mounting part 31, a document discharge part 32, and a document feeding mechanism 33. The documents MS placed in the document mounting part 31 are fed in turn one by one by the document feeding mechanism 33 to a position opposed to the document reading slit 23, and thereafter the document is discharged into the document discharge part 32. The document feeding part 3 is configured to be tiltable, functioning as a cover to open and close the top of the platen glass 22, and by bringing the document feeding part 3 upward, the top face of the platen glass 22 can be opened.

The main body part 4 includes a recording part 5, which provides a recording for a recording sheet P by the electrophotographic process, and further a paper feeding cassette 41, a paper feeding roller 42, a paper carrying passage 43, conveyance rollers 44, 45, and a paper discharging roller 46. The paper feeding roller 42, the conveyance rollers 44, 45, and the paper discharging roller 46 function as a conveyance part that conveys the recording sheet P. The recording sheets P accommodated in the paper feeding cassette 41 are fed out one by one into the paper carrying passage 43 by the paper feeding roller 42, and conveyed to the recording part 5 by the conveyance roller 44. Then, the recording sheet P, which has been provided with the recording by the recording part 5, is discharged to the paper delivery spacing 40 by the paper discharging roller 46.

The recording part 5 includes a photosensitive drum 51, an electrifier 52, a light scanning part 53, a developing part 54, a transfer roller 55, a fixing part 56, and a cleaning part 57. Image formation by the recording part 5 is performed by first uniformly electrifying the surface of the photosensitive drum 51 by the electrifier 52, and on the basis of the image data that has been read in the document reading part 2, scanning the surface of the photosensitive drum 51 by the light scanning part 53 to form an electrostatic latent image. Next, the electrostatic latent image formed on the surface of the photosensitive drum 51 is developed by the developing part 54 to form a toner image. The toner image formed on the surface of the photosensitive drum 51 is transferred to the recording sheet P, while the recording sheet P, which has been fed out from the paper feeding cassette 41, is passed through a nip part between the photosensitive drum 51 and the transfer roller 55. The toner image, which has been transferred to the recording sheet P, is thermally fixed to the recording sheet P, while it is passed through the fixing part 56.

Figure 2:
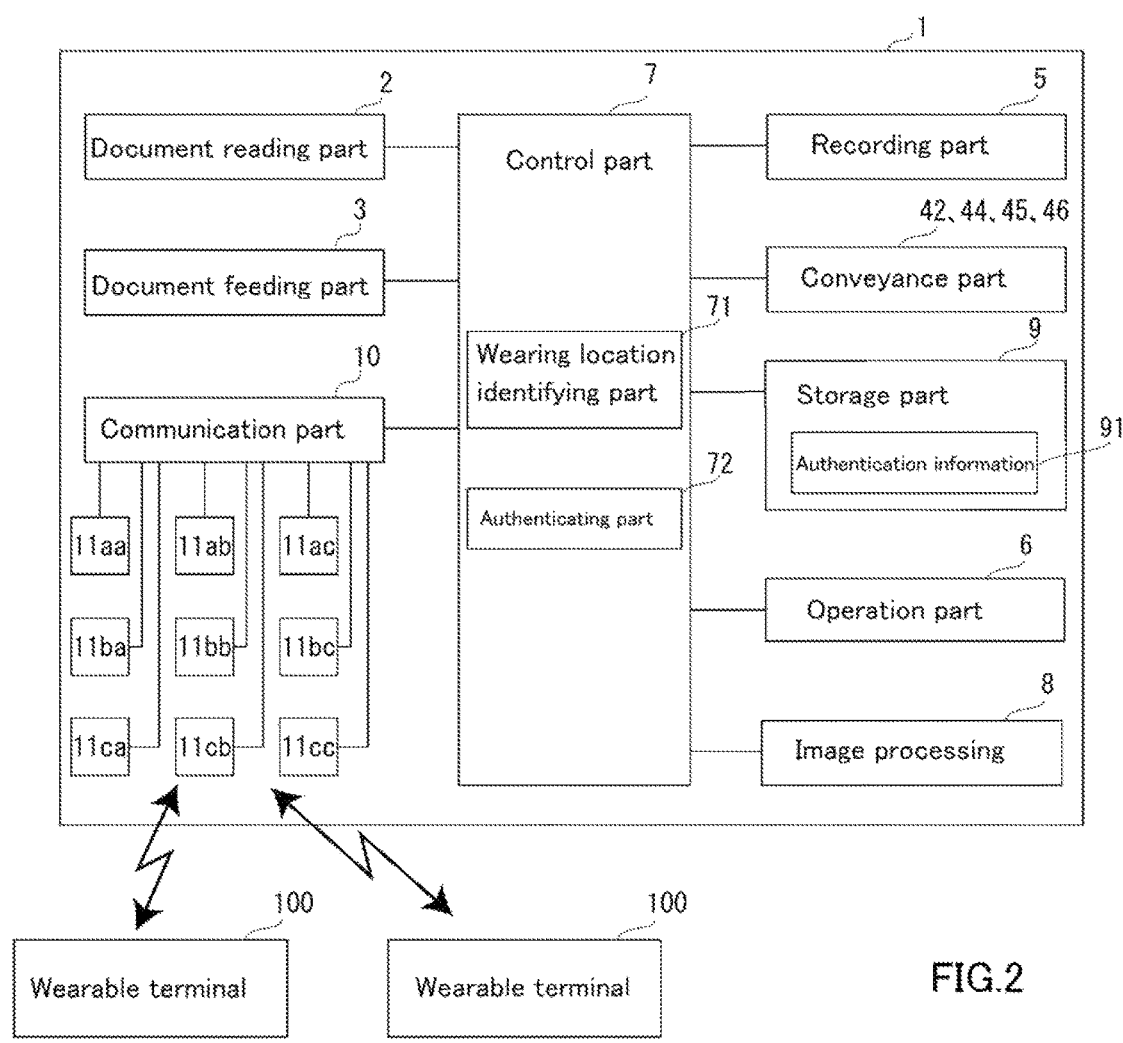
FIG. 2 is a block diagram illustrating a schematic configuration of an image forming apparatus shown in FIG. 1.

FIG. 2 gives a block diagram illustrating a schematic configuration of the image forming apparatus 1. The document reading part 2, the document feeding part 3, the conveyance part (the paper feeding roller 42, the conveyance rollers 44, 45, and the paper discharging roller 46), the recording part 5 and the operation part 6, which are abovementioned, are connected to the control part 7, being operation-controlled by the control part 7. In addition, to the control part 7, an image processing part 8 and a storage part 9 are connected, and a communication part 10, which performs communication with a wearable terminal 100 worn by the user, is connected.

The image processing part 8 is a means for performing a specific image processing operation on the image data, for example, enlargement/reduction processing, or image improvement processing, such as density adjustment or gradation adjustment.

The storage part 9 is a storage means, such as a semiconductor memory or a HDD (Hard Disk Drive), for storing an image data acquired by reading a document by the document reading part 2. In addition, in the storage part 9, a piece of authentication information 91 for performing user authentication using a wearable terminal 100 is stored. The piece of authentication information 91 is registered by the manager authority, and as shown in FIG. 3A, is configured that a piece of terminal information that identifies the wearable terminal 100; a piece of wearing location information that identifies a wearing location for each wearable terminal 100; and a piece of use authority information for indicating a function that can be used on the authentication. The piece of authentication information 91 is not required to correspond to the user in a one-to-one manner, but a plurality of pieces of authentication information 91 can be registered for a single user.

Figure 3B:
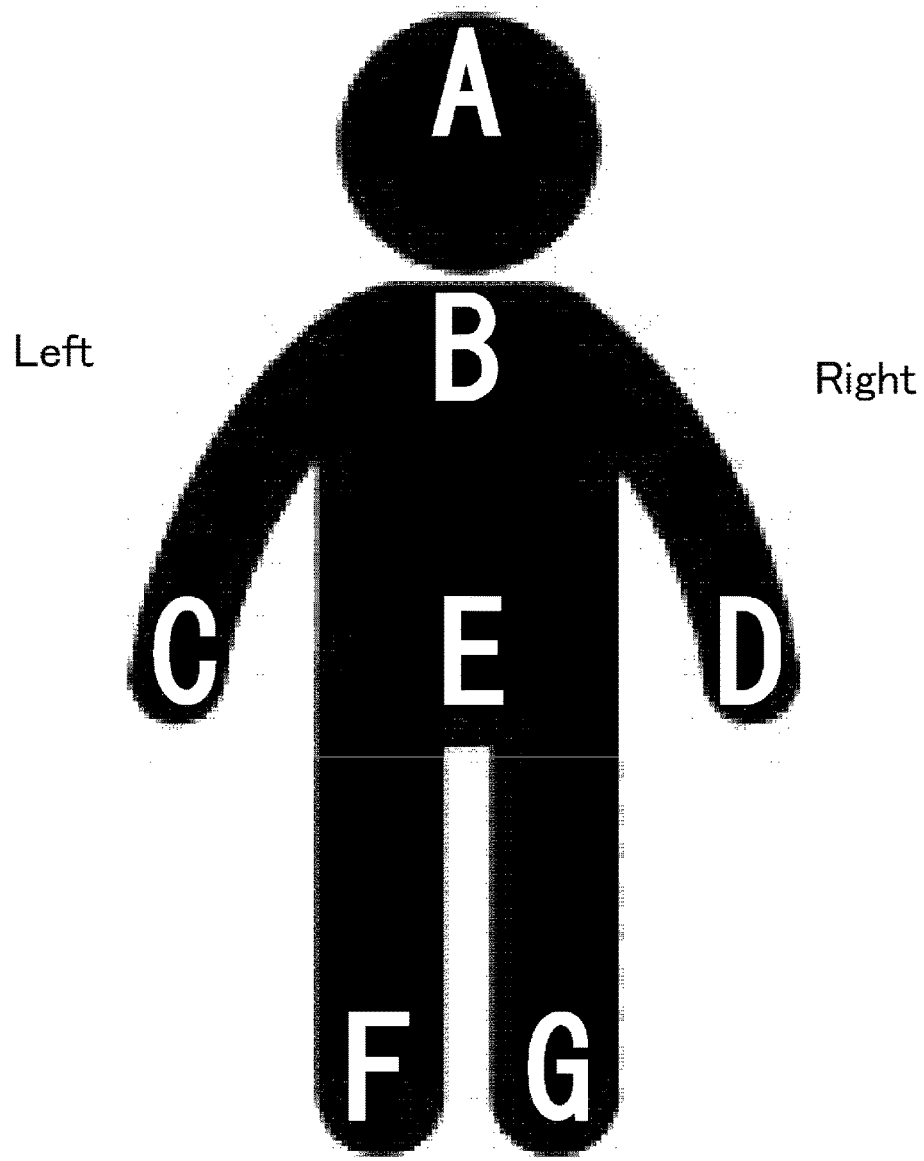
FIG. 3B is a figure giving an example of piece of authentication information stored in the storage part shown in FIG. 2.

As the piece of terminal information, the unique number possessed by the wearable terminal 100, or a terminal ID or terminal name that is provided by the user, or the like, can be used. In addition, any one of A (the head), B (the neck), C (the left hand), D (the right hand), E (the body), F (the left foot), and G (the right foot) as shown in FIG. 3B can be registered as a piece of wearing location information. In the present embodiment, the piece of terminal information is defined as the terminal name of the wearable terminal 100, and in an example given in FIG. 3A, the wearable terminal 100 having a terminal name of "aaaaa" that is worn on the left hand (C), and the wearable terminal 100 having a terminal name of "bbbbb" that is worn on the head (A) are registered. As the concrete form of the wearable terminal 100, for A (the head), glasses, a hat, a hair band, or the like, can be considered; for B (the neck), a necklace, or the like; for C (the left hand) and D (the right hand), a watch, a bracelet, or the like; for E (the body), a belt, or the like; and for F (the left foot) and G (the right foot), a shoe, an anklet, or the like. The authentication apparatus of the present disclosure is configured such that a plurality of sets of a piece of terminal information and a piece of wearing location information can be registered, and the more the number of registered sets of a piece of terminal information and a piece of wearing location information is, the higher the security will become. As the piece of use authority information, for example, it is possible to set a use authority of whether or not printing of a particular file or folder in the storage part 9 can be executed. In the case where a use authority is set with the property of a folder, the same use authority is set for the properties of files contained in the folder.

The communication part 10 has a function of transmitting to and receiving from various data with the wearable terminal 100 worn by the user through respective nine antennas 11aa to 11cc by short-range radio communication based on the Bluetooth (registered trademark) standard, or the like. In addition, in communication with the wearable terminal 100, the communication part 10 determines the communication intensity for each of the nine antennas 11aa to 11cc, and outputs the determined communication intensity to the control part 7.

Figure 4:
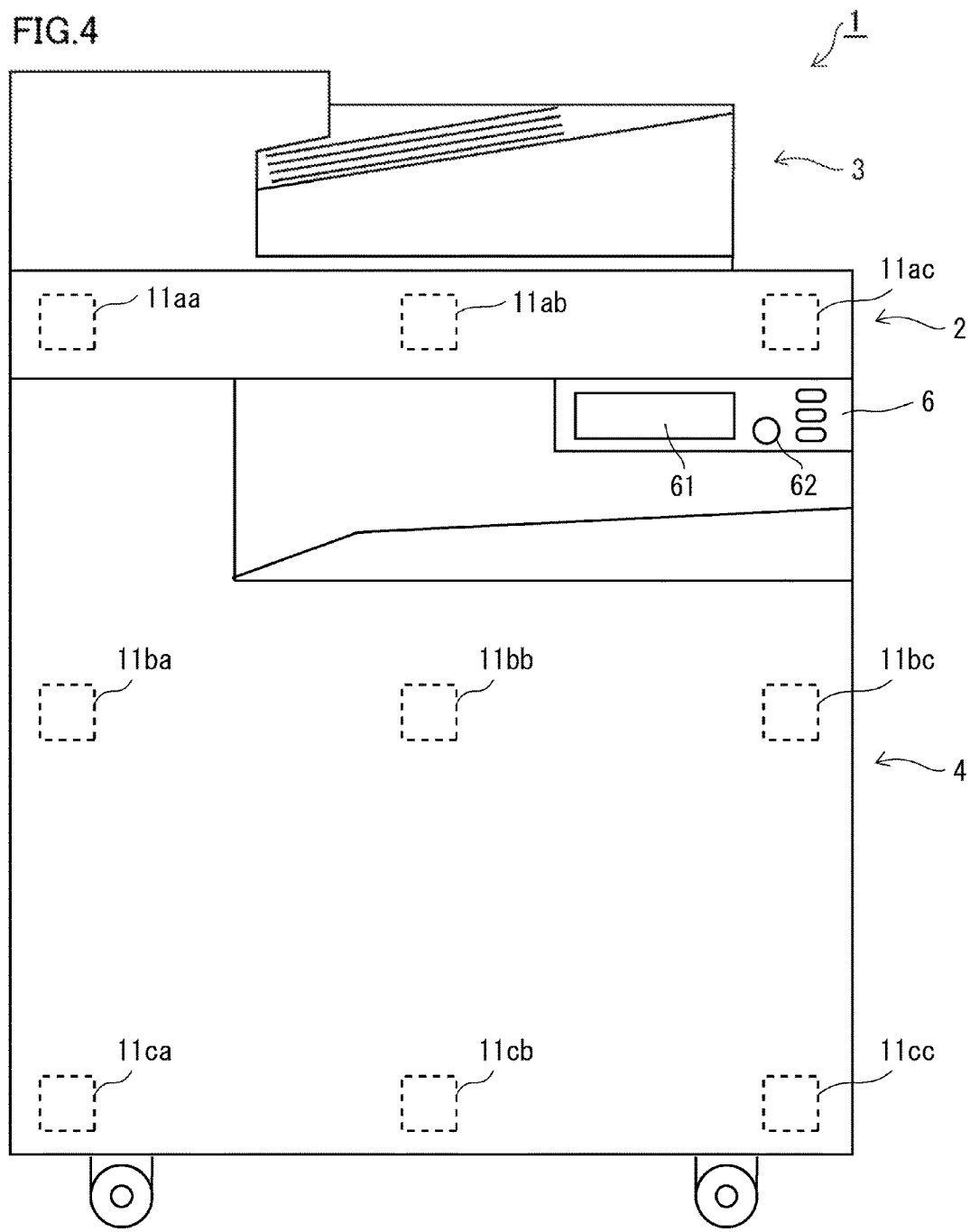
FIG. 4 is a front view of the image forming apparatus that gives an example of layout of antennas shown in FIG. 2.

As shown in FIG. 4, the nine antennas 11aa to 11cc are disposed on the front face of the image forming apparatus 1 with a spacing being given in a vertical direction and a longitudinal one thereof. In the present embodiment, the antennas 11aa, 11ab, and 11ac are disposed on the upper stage; the antennas 11ba, 11bb, and 11bc on the intermediate stage; and the antennas 11ca, 11cb, 11cc on the lower stage. In addition, when the user squarely faces the image forming apparatus 1, the antennas 11aa, 11ba, and 11ca are located at left of the user; the antennas 11ab, 11bb, and 11cb just in front of the user; and the antennas 11ac, 11bc, and 11cc at right of the user.

The control part 7 is an information processing part, such as a microcomputer, that is provided with an ROM (Read Only Memory), an RAM (Random Access Memory), and the like. In the ROM, a control program for performing operation control of the image forming apparatus 1 is stored. The control part 7 reads out the control program stored in the ROM, and expands the control program in the RAM, thereby controlling the entire apparatus in accordance with a specific piece of instruction information that has been inputted from the operation part 6. In addition, the control part 7 functions as a wearing location identifying part 71, and an authenticating part 72.

Figure 5C:
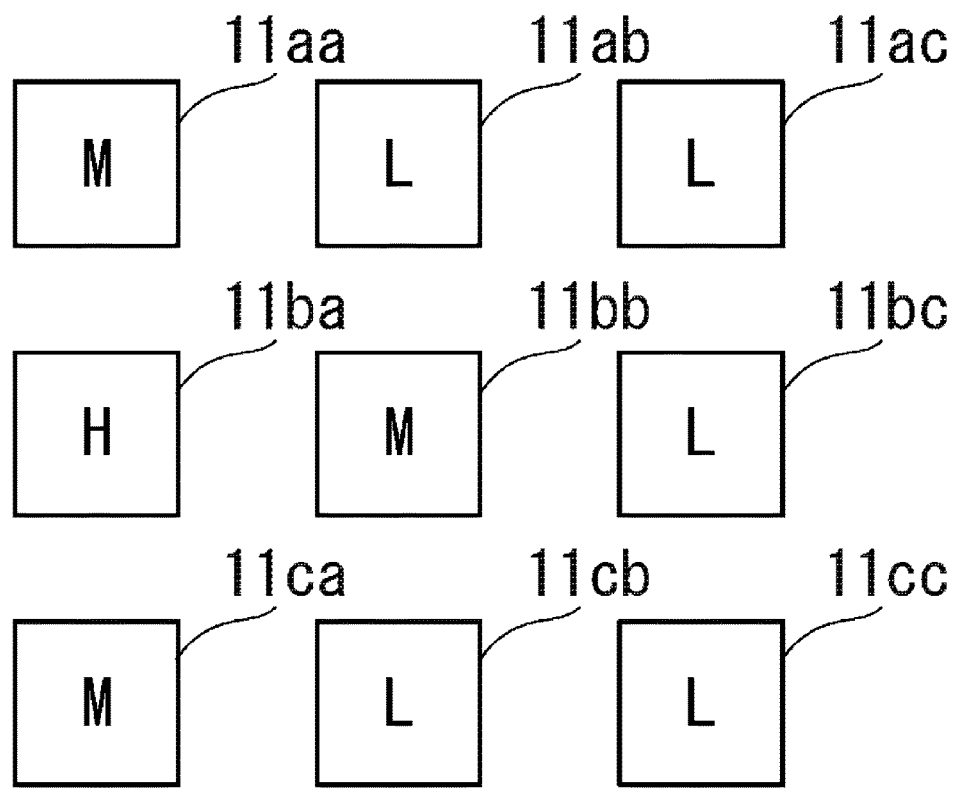
FIG. 5C is an explanatory drawing illustrating an example of identification of a wearing location by the wearing location identifying part shown in FIG. 2.

The wearing location identifying part 71 identifies the wearing location of the wearable terminal 100 worn by the user on the basis of the determination result (the communication intensity) for the respective nine antennas 11aa to 11cc that is inputted from the communication part 10. For example, the communication part 10 measures the communication intensity in communication through the respective nine antennas 11aa to 11cc, and relatively determines the communication intensity as "High (H)", "Medium (M)", or "Low (L)". In this case, the wearing location identifying part 71 can identify the wearing location of the wearable terminal 100 worn by the user through the distribution of the "High (H)", "Medium (M)", and "Low (L)" that have been determined by the communication part 10. In the case where the determination for the antenna 11ab in the middle on the upper stage is "High (H)" and the more distant from the antenna 11ab a particular antenna is, the lower the communication intensity therefore is, the wearing location can be identified to be A (the head) or B (the neck) as shown in FIG. 5A and FIG. 5B. Then, which is the wearing location, A (the head) or B (the neck), can be identified on the signal intensities on the intermediate and lower stages. In addition, in the case where the determination for the antenna 11ba on the left side on the intermediate stage is "High (H)" and the more distant from the antenna 11ba a particular antenna is, the lower the communication intensity therefore is, the wearing location can be identified to be C (the left hand) as shown in FIG. 5C. Further, in the case where the determination for the antenna 11bc on the right side on the intermediate stage is "High (H)" and the more distant from the antenna 11bc a particular antenna is, the lower the communication intensity therefore is, the wearing location can be identified to be D (the right hand) as shown in FIG. 5D. Further, in the case where the determination for the antenna 11bb in the middle on the intermediate stage is "High (H)" and the more distant from the antenna 11bb a particular antenna is, the lower the communication intensity therefore is, the wearing location can be identified to be E (the body) as shown in FIG. 5E. Further, in the case where the determination for the antenna 11ca on the left side on the lower stage is "High (H)" and the more distant from the antenna 11ca a particular antenna is, the lower the communication intensity therefore is, the wearing location can be identified to be F (the left foot) as shown in FIG. 5F. Further, in the case where the determination for the antenna 11cc on the right side on the lower stage is "High (H)" and the more distant from the antenna 11cc a particular antenna is, the lower the communication intensity therefore is, the wearing location can be identified to be G (the right foot) as shown in FIG. 5G.

When an authentication operation is instructed to be made, the authenticating part 72 uses the communication part 10 to acquire the terminal name of the wearable terminal 100 as a piece of terminal information, and acquires the wearing location that has been identified by the wearing location identifying part 71. Then, the authenticating part 72 collates the terminal name of the wearable terminal 100 and the wearing location thereof that have been acquired with the piece of authentication information 91 that is stored in the storage part 9. This collation is performed for all the wearable terminals 100 that are communicatable with the use of the communication part 10. As a result of the collation, coincidence with the piece of terminal information and the piece of wearing location information that are registered in the piece of authentication information 91 is indicated, the authenticating part 72 authenticates the user to perform log-in processing, and on the basis of the piece of use authority information in the piece of authentication information 91, permits use of the image forming apparatus 1.

Next, by referring to FIG. 6, the authentication operation using the wearable terminal 100 with the image forming apparatus 1 will be explained in detail.

If the control part 7 receives an input of authentication start instruction from the operation part 6 by the user (at step A1), the control part 7 functions as the authenticating part 72, and using the communication part 10, starts communication with the wearable terminal 100. Then, the authenticating part 72 acquires the terminal name of the wearable terminal 100 that has been detected (at step A2). In addition, the control part 7 functions as the wearing location identifying part 71, and on the basis of the result of determination (the communication intensity) for the respective nine antennas 11aa to 11cc that is inputted from the communication part 10, identifies the wearing location of the wearable terminal 100 the terminal name of which has been acquired at step A2 (at step A3). The acquisition of the terminal name at step A2 and the identification of the wearing location at step A3 are performed for all the wearable terminals 100 that have been detected.

Next, the authenticating part 72 collates the terminal name of the wearable terminal 100 that has been acquired and the wearing location thereof with the piece of authentication information 91 that is stored in the storage part 9 (at step A4), and for each of the wearable terminals 100 that have been detected, determines whether the wearing location thereof coincides with the piece of wearing location information that is registered in the authentication information 91 (at step A5).

If, at step A5, there is a piece of authentication information that indicates coincidence, the authenticating part 72 authenticates the user to perform log-in processing (step A6), and on the basis of the piece of use authority information in the piece of authentication information 91, permits use of the image forming apparatus 1, terminating the authentication operation.

If, at step A5, there is no piece of authentication information 91 that indicates coincidence, the authenticating part 72 gives a message of authentication failure on the touch panel 61 in the operation part 6, reporting the authentication failure to the user (at step A7), and terminating the authentication operation. If the user forgets wearing of all or a part of the wearable terminals 100, or if communication setting is turned off at all or a part of the wearable terminals 100, the terminal names of all or the part of the wearable terminals 100 that are registered as pieces of terminal information in the piece of authentication information 91 cannot be acquired, resulting in an authentication failure. In addition, if the user wears a particular wearable terminal 100 in a location different from the registered one, the wearing location of the wearable terminal 100 that has been identified by the wearing location identifying part 71 is not coincident with the piece of wearing location information that is registered in the piece of authentication information 91, resulting in an authentication failure. Further, it is recommended that the reason for the authentication failure and a solution thereto be displayed by giving a message of authentication failure (for example, "Wearable terminal that is registered could not have been recognized. Check whether communication setting is not turned off.").

Identification of the wearing location by the wearing location identifying part 71 is performed on the basis of the communication intensity in communication through the respective nine antennas 11aa to 11cc. Therefore, in the case where the user does not stand in front of the image forming apparatus 1 in a posture of squarely facing it, there is the possibility that a correct wearing location may not be identified. Therefore, it is recommended that, before communication with the wearable terminal 100 being started, the authenticating part 72 display a message requesting the user to squarely face the image forming apparatus 1 on the touch panel 61 in the operation part 6. Alternatively, a camera for photographing the user may be provided in the image forming apparatus 1, and from the photographing data of this camera, the posture of the user may be recognized. In this case, it becomes possible to identify the correct wearing location on the basis of the recognized posture and the communication intensity in communication.

In addition, in the case where the user has worn the wearable terminal 100 in a wrong wearing location, or the wearing location identifying part 71 has wrongly identified the wearing location, all or a part of the pieces of wearing location information will be made different, although the collation at step A4 will indicate coincidence with the piece of terminal information in the piece of authentication information 91. Then, the authentication apparatus 1 may be adapted such that, in the case where coincidence with the piece of terminal information in the piece of authentication information 91 is indicated, the user is inquired about the wearing location, and if the correct answer is inputted, the user is authenticated for performing log-in processing.

In addition, the authentication apparatus 1 may be configured such that the user authentication is performed with a plurality of wearable terminals 100, regardless of the wearing location. The piece of authentication information 91a in this case is given in FIG. 7. With the piece of authentication information 91a, the piece of terminal information that identifies one wearable terminal 100 is registered as main, while the piece of terminal information that identifies another wearable terminal 100 is registered as sub. The authenticating part 72 makes communication only with the wearable terminal 100 registered in the piece of authentication information 91a as main, using the communication part 10 for performing an authentication operation. In the case where the wearable terminal 100 that has been detected through communication is registered in the piece of authentication information 91a as main, the authenticating part 72 requests the wearable terminal 100 of main to collect the pieces of terminal information of the wearable terminals 100 of sub. The wearable terminal 100 of main performs communication with the wearable terminals 100 of sub to collect the pieces of terminal information of the wearable terminals 100 of sub and transmit them in a collective manner to the image forming apparatus 1. In this way, in the case where all the wearable terminals 100 of main and sub, which are registered as the pieces of terminal information, have been detected, the authenticating part 72 authenticates the user for performing log-in processing.

By the way, in the wearable terminal 100 of main collecting the pieces of terminal information of the wearable terminals 100 of sub, if a particular wearable terminal 100 of sub is turned off, the user authentication will fail. Then, it is recommended that, just before the power for the particular wearable terminal 100 of sub being turned off, the piece of terminal information thereof be transmitted to the wearable terminal 100 of main, and in the wearable terminal 100 of main, the piece of terminal information of the particular wearable terminal 100 of sub the power for which has been turned off be stored. However, the storage of the piece of terminal information of the particular wearable terminal 100 of sub in the wearable terminal 100 of main shall be made only for a definite period of time that has been preset. Thereby, even if the power for a particular wearable terminal 100 of sub is turned off, the user authentication can be performed only during a definite period of time with no problem. Further, in the case where the power for the particular wearable terminal 100 of sub is turned on from the off-state, the piece of terminal information thereof that has been stored in the wearable terminal 100 of main will be deleted.

In addition, as shown in FIG. 8A and FIG. 8B, the authentication apparatus 1 may be adapted such that a piece of authentication information 91b in which a wearable terminal 100 that is worn by an approver other than the person in question and the wearing location thereof are registered is stored in the storage part 9, and without the approver, the authentication will not be performed.

Figure 9B:
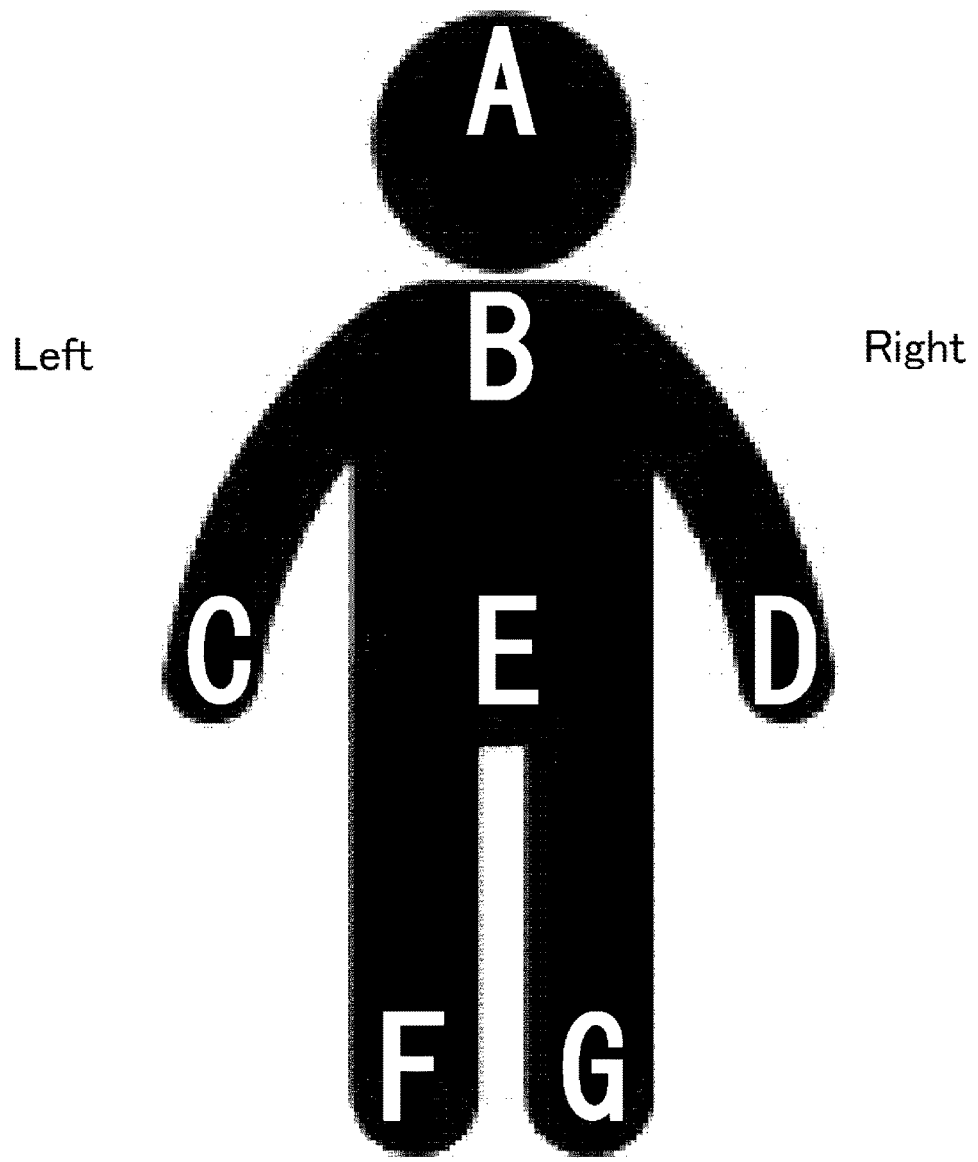
FIG. 9B is a figure giving another example of piece of authentication information stored in the storage part shown in FIG. 2.

Further, as shown in FIG. 9A and FIG. 9B, the authentication apparatus 1 may be adapted such that a piece of authentication information 91c in which the piece of terminal information of a particular wearable terminal 100 and the moving route (motion) therefore are registered is stored in the storage part 9, and if the wearing location identifying part 71 detects the moving route for the particular wearable terminal 100, and coincidence is indicated for both, the user is authenticated for performing log-in processing. In an example given in FIG. 9A and FIG. 9B, the moving route along which the wearable terminal 100 having the terminal name of "aaaaa" is moved from C (a location on the left hand) to D (a location on the right hand) through E (a location on the body) is registered as a piece of wearing location information. Therefore, by the user who squarely faces the image forming apparatus 1 moving the wearable terminal 100 having the terminal name of "aaaaa" from the location of C to D (the location on the right hand) through E (the location on the body), user authentication is performed.

As described above, according to the present embodiment, there is provided an authentication apparatus, including a storage part 9 that stores a piece of authentication information 91 in which a piece of terminal information that identifies a wearable terminal 100 worn by the user is registered, a communication part 10 that makes communication with the wearable terminal 100 worn by the user to acquire a piece of terminal information, and an authenticating part 72 that, in the case where the same piece of terminal information as that registered in the piece of authentication information 91 is acquired by the communication part 10, performs user authentication.

With this configuration, there is no need for preparing a special terminal, and a wearable terminal 100 that is normally worn by the user can be used as a tool for authentication, whereby a high security can be achieved. In addition, there is no need for memorizing a plurality of ciphers, and compared with the case where the number, or the like, alone is used, the security can be more easily enhanced. Further, the biometric authentication may provide a wrong recognition under the influence of a disease, an accident, or the like, and therefore the authentication that is performed by the present authentication apparatus is more reliable than is performed by the biometric authentication.

With a typical technique, a third party that has illegally obtained a mobile terminal is also authenticated as the user thereof, and thus there has been a problem that a high security cannot be achieved.

The present disclosure has been made in view of such problem, and is intended to provide an authentication apparatus that uses a wearable terminal worn by a user for performing user authentication, whereby a high security can be achieved.

According to the present disclosure, there is provided an advantage that there is no need for preparing a special terminal, and a wearable terminal that is normally worn by the user can be used as a tool for authentication, whereby a high security can be achieved.

Further, according to the present embodiment, in the piece of authentication information 91, a piece of wearing location information that indicates the wearing location of the wearable terminal 100 is registered together with the piece of terminal information, and there is provided a wearing location identifying part 71 that identifies the wearing location of the wearable terminal 100 worn by the user, the authenticating part 72 performing user authentication in the case where the piece of terminal information that has been acquired is the same as that registered in the piece of authentication information 91, and the wearing location that has been identified by the wearing location identifying part 71 coincides with the piece of wearing location information.

With this configuration, the determination that is based on the location where the wearable terminal 100 is worn allows the security to be further enhanced.

Further, according to the present embodiment, the communication part 10 makes communication with the wearable terminal 100 through each of a plurality of antennas 11aa to 11cc that are disposed in different locations, and the wearing location identifying part 71 identifies the wearing location of the wearable terminal 100 on the basis of the signal intensity for each of the plurality of antennas 11aa to 11cc.

With this configuration, the location where the wearable terminal 100 is worn can be identified by a simple means.

Further, according to the present embodiment, in the piece of authentication information 91, a plurality of pieces of terminal information are registered, and in the case where the same pieces of terminal information as the pieces of terminal information that have been registered in the piece of authentication information 91 have all been acquired by the communication part 10, the authenticating part 72 performs user authentication.

With this configuration, a plurality of wearable terminals 100 can be used as authentication tools, whereby a higher security can be achieved.

Further, according to the present embodiment, in the piece of authentication information 91, a piece of terminal information of the wearable terminal 100 of main and pieces of terminal information of wearable terminals 100 of sub are registered, and the communication part 10 acquires the pieces of terminal information of the wearable terminals 100 of sub through the wearable terminal 100 of main.

With this configuration, communication may be made only with the main wearable terminal 100, thereby the communication traffic being relieved.

Further, according to the present embodiment, in the wearable terminal 100 of main, the piece of terminal information of a particular wearable terminal 100 of sub the power for which has been turned off can be temporarily stored, and the communication part 10 can acquire the piece of terminal information of the particular wearable terminal 100 of sub from the wearable terminal 100 of main.

With this configuration, even if the power for a particular wearable terminal 100 of sub is turned off, user authentication can be performed unless a definite period of time has elapsed.

The present disclosure is not limited to the above-described embodiments, and it is obvious that they can be altered in appropriate ways within the scope of the technical concept of the present disclosure.

What is claimed is:
1. An authentication apparatus, comprising:
   a storage part that stores a piece of authentication information in which a piece of terminal information that identifies a wearable terminal worn by a user and a piece of wearing location information that indicates a wearing location of the wearable terminal are registered together,
   a communication part that makes communication with the wearable terminal worn by the user to acquire the piece of terminal information,
   a wearing location identifying part that determines and identifies a location on the user's body at which the wearable terminal is worn, and
   an authenticating part that, in the case where the same piece of terminal information as the piece of terminal information registered in the piece of authentication information has been acquired by the communication part and the identified location on the user's body matches the registered wearing location, performs user authentication.
2. The authentication apparatus according to claim 1, wherein the communication part makes communication with the wearable terminal through each of a plurality of antennas that are disposed in different locations, and the wearing location identifying part identifies the wearing location of the wearable terminal on the basis of the signal intensity for each of the plurality of antennas.

3. The authentication apparatus according to claim 1, wherein, in the piece of authentication information, a plurality of the pieces of terminal information are registered, and the authenticating part performs user authentication in the case where the same pieces of terminal information as the pieces of terminal information that have been registered in the piece of authentication information have all been acquired by the communication part.

4. The authentication apparatus according to claim 3, wherein, in the piece of authentication information, a piece of terminal information of a wearable terminal of main and a piece of terminal information of a wearable terminal of sub are registered, and the communication part acquires the piece of terminal information of the wearable terminal of sub through the wearable terminal of main.

5. The authentication apparatus according to claim 4, wherein, in the wearable terminal of main, the piece of terminal information of the wearable terminal of sub the power for which is turned off is capable of being temporarily stored, and the communication part acquires the piece of terminal information of the wearable terminal of sub from the wearable terminal of main.

6. The authentication apparatus according to claim 1, wherein the storage device stores a registered wearable location for each of a plurality of wearable terminals, and wherein said registered wearable locations are selected from different members of the group consisting of head, neck, left hand, right hand, body, left foot, and right foot.

7. The authentication apparatus according to claim 1, further comprising a control part and a plurality of antennas that can communicate with the wearable terminal by a respective relative intensity, wherein the control part is configured to determine the location on the user's body at which the wearable terminal is worn based on the relative communication intensities.

* * * * *